United States Patent
Fan et al.

(10) Patent No.: US 7,625,530 B2
(45) Date of Patent: Dec. 1, 2009

(54) METHOD FOR MANUFACTURING ISOTOPE-DOPED CARBON NANOTUBES

(75) Inventors: Shou-Shan Fan, Beijing (CN); Liang Liu, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 683 days.

(21) Appl. No.: 11/141,575

(22) Filed: May 31, 2005

(65) Prior Publication Data

US 2006/0070868 A1    Apr. 6, 2006

(30) Foreign Application Priority Data

Jun. 10, 2004    (CN) .................. 2004 1 0027651

(51) Int. Cl.
    *B01J 19/12*    (2006.01)
(52) U.S. Cl. .............. 422/186.01; 427/212; 428/403; 977/700
(58) Field of Classification Search ............ 422/186.01; 428/403; 427/212
See application file for complete search history.

(56) References Cited

U.S. PATENT DOCUMENTS 6,517,800 B1 *    2/2003    Cheng et al. ............. 423/447.1

2004/0101685 A1 *    5/2004    Fan et al. .................. 428/403

OTHER PUBLICATIONS

W. Z. Li, "Large-Scale Synthesis of Aligned Carbon Nanotubes," *Science*, vol. 274, No. 5293, pp. 1701-1703 (1996).

* cited by examiner

*Primary Examiner*—Alexa D Neckel
*Assistant Examiner*—Xiuyu Tai
(74) *Attorney, Agent, or Firm*—D. Austin Bonderer

(57) ABSTRACT

A method for manufacturing isotope-doped carbon nanotubes (10) includes the steps of: (a) providing a carbon rod (209) connected with an anode (214) of an electrical source, the carbon rod including at least two kinds of carbon isotope segments (202, 203) arranged therealong according to need; (b) providing a pure carbon rod (208) connected with a cathode (215) of the electrical source, the pure carbon rod positioned corresponding to the carbon rod and including carbon-12 isotopes; and (c) producing an arc discharge between the carbon rod and the pure carbon rod, wherein the carbon isotope segments of the carbon rod are consumed sequentially to form the isotope-doped carbon nanotubes on a surface of the pure carbon rod. Growth mechanisms of the isotope-doped carbon nanotubes manufactured by this method can be readily studied.

18 Claims, 2 Drawing Sheets

METHOD FOR MANUFACTURING ISOTOPE-DOPED CARBON NANOTUBES

CROSS-REFERENCE TO RELATED APPLICATIONS

This application is related to U.S. patent application Ser. No. 10/402,701, entitled "ISOTOPE-DOPED CARBON NANOTUBE AND METHOD AND APPARATUS FOR FORMING THE SAME" and filed on Mar. 28, 2003. The disclosure of the above identified application is incorporated herein by reference.

BACKGROUND OF THE INVENTION

The present invention relates to methods for manufacturing carbon nanotubes, and more particularly to methods for manufacturing isotope-doped carbon nanotubes.

Carbon nanotubes are very small tube-shaped structures essentially having a composition of a graphite sheet rolled into a tube. Carbon nanotubes have interesting and potentially useful electrical and mechanical properties, and offer potential for various uses in electronic devices. Carbon nanotubes also feature extremely high electrical conductivity, very small diameters (much less than 100 nanometers), large aspect ratios (i.e. length/diameter ratios) (greater than 1000), and a tip-surface area near the theoretical limit (the smaller the tip-surface area, the more concentrated the electric field, and the greater the field enhancement factor). These features make carbon nanotubes ideal candidates for electron field emitters, white light sources, lithium secondary batteries, hydrogen storage cells, transistors, and cathode ray tubes (CRTs).

Generally, there are three methods for manufacturing carbon nanotubes. The first method is the arc discharge method, which was first discovered and reported in an article by Sumio Iijima entitled "Helical Microtubules of Graphitic Carbon" (Nature, Vol. 354, Nov. 7, 1991, pp.56-58). The second method is the laser ablation method, which was reported in an article by T. W. Ebbesen et al. entitled "Large-scale Synthesis of Carbon Nanotubes" (Nature, Vol. 358, 1992, pp. 220). The third method is the chemical vapor deposition (CVD) method, which was reported in an article by W. Z. Li entitled "Large-scale Synthesis of Aligned Carbon Nanotubes" (Science, Vol. 274, 1996, pp. 1701).

Isotope labeling is a powerful tool in the study of nanomaterial growth mechanisms and nano-sized isotope junction synthesis. Methods of isotope labeling use reactants containing different isotopes of a special element (usually light elements such as carbon, boron, nitrogen and oxygen), which are fed in designated concentrations (pure or mixed) and sequences into a nano-material synthesis process to provide in situ isotope labeling of nano-materials.

However, the carbon nanotubes manufactured by the above-mentioned three methods are not isotope-doped, and the growth mechanisms of such carbon nanotubes cannot be readily studied.

What is needed, therefore, is a method for manufacturing isotope-doped carbon nanotubes.

SUMMARY

The present invention provides a method for manufacturing isotope-doped carbon nanotubes. A preferred embodiment of the method includes the steps of: (a) providing a carbon rod connected with an anode of an electrical source, the carbon rod including at least two kinds of carbon isotope segments arranged therealong according to need; (b) providing a pure carbon rod connected with a cathode of the electrical source, the pure carbon rod positioned corresponding to the carbon rod and including carbon-12 isotopes; and (c) producing an arc discharge between the carbon rod and the pure carbon rod, wherein the carbon isotope segments of the carbon rod are consumed sequentially to form the isotope-doped carbon nanotubes on a surface of the pure carbon rod.

Compared with conventional carbon nanotube manufacturing methods, the preferred method of the present invention can manufacturre the isotope-doped carbon nanotubes each including at least two kinds of carbon nanotube isotope segments. Therefore, growth patterns of the carbon isotopes can be recorded respectively by means of Raman Spectrum or by means of Secondary Ion Mass Spectroscopy. Thus, growth mechanisms of the carbon nanotubes can be readily studied corresponding to the growth patterns of the carbon isotopes.

Other advantages and novel features will become more apparent from the following detailed description of preferred embodiments when taken in conjunction with the accompanying drawings, in which:

DETAILED DESCRIPTION OF PREFERRED EMBODIMENTS

Reference will now be made to the drawings to describe preferred embodiments of the present invention in detail.

Figure 1:
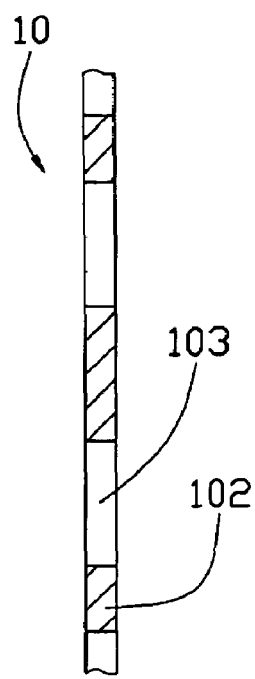
FIG. 1 is a schematic, side elevation view of a carbon nanotube made in accordance with a first preferred embodiment of the present invention.

Referring to FIG. 1, an isotope-doped carbon nanotube 10 manufactured by a method in accordance with a first preferred embodiment of the present invention is shown. The carbon nanotube 10 comprises a plurality of first carbon nanotube isotope segments 102 and a plurality of second carbon nanotube isotope segments 103 alternately arranged along a longitudinal direction of the carbon nanotube 10. The first and second carbon nanotube isotope segments 102, 103 are selected from the group of consisting of a carbon-12 isotope segment, a carbon-13 isotope segment, and a carbon-14 isotope segment, according to need. In the first preferred embodiment, each first carbon nanotube isotope segment 102 is made of carbon-12 isotopes, and each second carbon nanotube isotope segment 103 is made of carbon-13 isotopes. In the first preferred embodiment, a length of the carbon nanotube 10 is in the range from 10 to 1000 micrometers, and a diameter of the carbon nanotube 10 is in the range from 0.5 to 50 nanometers.

Figure 2:
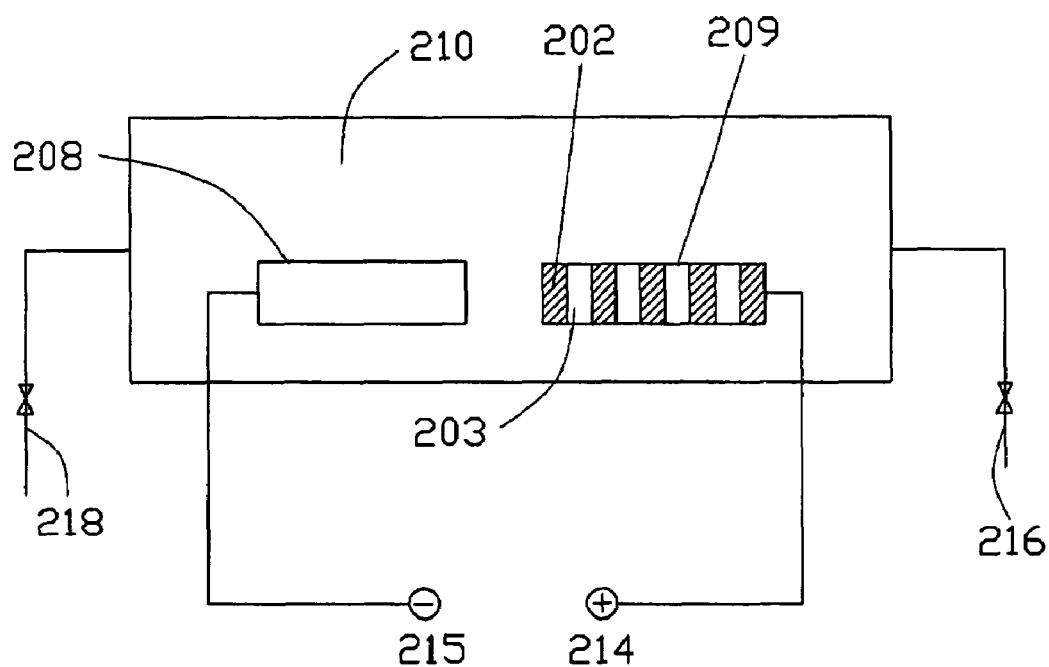
FIG. 2 is a schematic, side elevation view of a first device for manufacturing a plurality of carbon nanotubes of FIG. 1.

Referring to FIG. 2, the method in accordance with the first preferred embodiment of the present invention includes the steps of:
  (a) providing a carbon rod 209 connected with an anode 214 of an electrical source, the carbon rod 209 including two kinds of (i.e., first and second) carbon isotope segments 202 and 203 alternately arranged along a longitudinal direction of the carbon rod 209;

(b) providing a pure carbon rod 208 connected with a cathode 215 of the electrical source, the pure carbon rod 208 positioned corresponding to the carbon rod 209 and including carbon-12 isotopes;

(c) putting the carbon rod 209 and the pure carbon rod 208 into an arc discharge reaction chamber 210, vacuumizing the arc discharge reaction chamber 210 via an outlet pipe 216 thereof, and inputting a protection gas to the arc discharge reaction chamber 210 via an inlet pipe 218 thereof; and (d) switching on the electrical source and producing an arc discharge between the carbon rod 209 and the pure carbon rod 208, such that the carbon isotope segments 202, 203 are consumed in sequence to form the isotope-doped carbon nanotubes 10.

In step (a), the carbon rod 209 can be manufactured by a powder delamination pressing method, which includes the following steps:

(a1) mixing a catalyst powder with carbon-12 powder and carbon-13 powder respectively to form two kinds of powder mixtures;

(a2) pressing the first powder mixture including carbon-12 isotopes under 3500 pascals to form one first carbon isotope segment 202;

(a3) pressing the second powder mixture including carbon-13 isotopes under 3500 pascals on the first carbon isotope segment 202 to form one second carbon isotope segment 203; and (a4) repeating steps (a2) and (a3) appropriately in turn to form the carbon rod 209.

In step (a1), the catalyst powder can be a nickel powder, a yttrium oxide powder, or a mixture thereof. In the first preferred embodiment, a diameter of the carbon rod 209 is about 10 millimeters.

Alternatively, the carbon rod 209 can be manufactured by a paste delamination sintering method, which includes the following steps:

(a1') mixing a catalyst powder, a solvent with a carbon-12 powder and a carbon-13 powder respectively to form two kinds of paste mixtures;

(a2') coating/printing and drying a layer of the first mixture paste including carbon-12 isotopes to form one first carbon isotope segment 202;

(a3') coating/printing and drying a layer of the second mixture paste including carbon-13 isotopes on the first carbon isotope segment 202 to form one second carbon isotope segment 203; and (a4') repeating steps (a2') and (a3') appropriately in turn to form the carbon rod 209.

In step (a1'), the catalyst powder can be a nickel powder, a yttrium oxide powder, or a mixture thereof. In the first preferred embodiment, a diameter of the carbon rod 209 is about 10 millimeters.

In step (c), a distance between the carbon rod 209 and the pure carbon rod 208 is in the range from 1.5 to 2 millimeters. The protection gas can be helium gas, argon gas, nitrogen gas, or hydrogen gas. In the first preferred embodiment, the protection gas is helium gas, and a pressure of the helium gas is in the range from 100 to 500 torr.

In step (d), the discharge current is about 100 amperes, and the discharge voltage is in the range from 20 to 40 volts. During the growth process of the carbon nanotubes 10, the first carbon isotope segment 202 is firstly consumed to form the first carbon nanotube isotope segments 102 on the pure carbon rod 208. Then, the second carbon isotope segment 203 is consumed to form the second carbon nanotube isotope segments 103 on the first carbon nanotube isotope segments 102.

Figure 3:
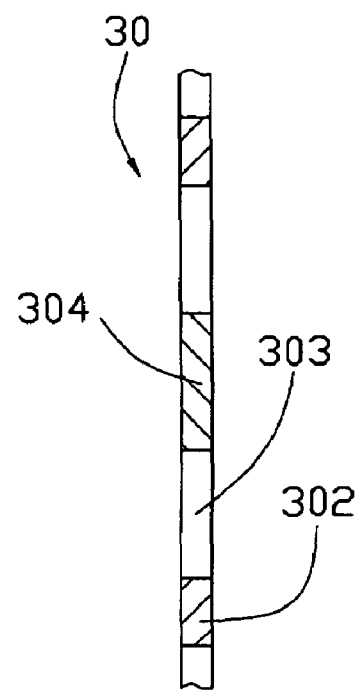
FIG. 3 is a schematic, side elevation view of a carbon nanotube made in accordance with a second preferred embodiment of the present invention.

Referring to FIG. 3, an isotope-doped carbon nanotube 30 manufactured by a method in accordance with a second preferred embodiment of the present invention is shown. The carbon nanotube 30 comprises a plurality of first carbon nanotube isotope segments 302, a plurality of second carbon nanotube isotope segments 303 and a plurality of third carbon nanotube isotope segments 304 arranged along a longitudinal direction of the carbon nanotubes 30 according to need. In the second preferred embodiment, each first carbon nanotube isotope segment 302 is made of carbon-12 isotopes, each second carbon nanotube isotope segment 303 is made of carbon-13 isotopes, and each third carbon nanotube isotope segment 304 is made of carbon-14 isotopes. In the second preferred embodiment, a length of the carbon nanotube 30 is in the range from 10 to 1000 micrometers, and a diameter of the carbon nanotube 30 is in the range from 0.5 to 50 nanometers.

Figure 4:
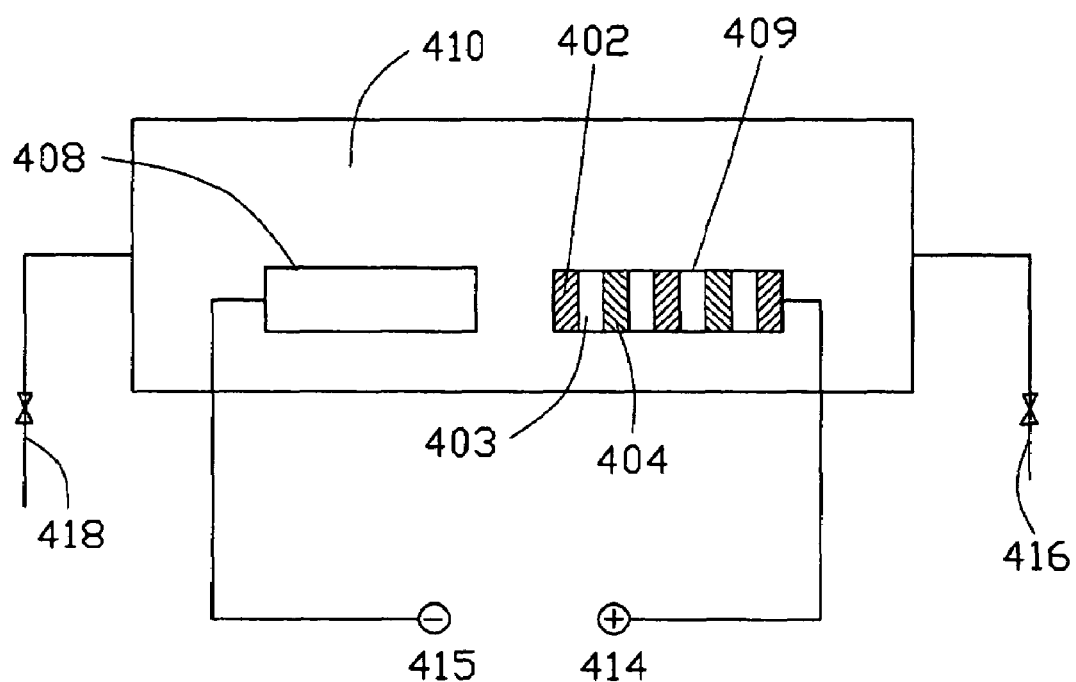
FIG. 4 is a schematic, side elevation view of a second device for manufacturing a plurality of carbon nanotubes of FIG. 3.

Referring to FIG. 4, the method in accordance with the second preferred embodiment of the present invention includes the steps of:

(e) providing a carbon rod 409 connected with an anode 414 of an electrical source, the carbon rod 409 including three kinds of (i.e., first, second and third) carbon isotope segments 402, 403 and 404 alternately arranged along a longitudinal direction of the carbon rod 409;

(f) providing a pure carbon rod 408 connected with a cathode 415 of the electrical source, the pure carbon rod 408 positioned corresponding to the carbon rod 409 and including carbon-12 isotopes;

(g) putting the carbon rod 409 and the pure carbon rod 408 into an arc discharge reaction chamber 410, vacuumizing the arc discharge reaction chamber 410 via an outlet pipe 416 thereof, and inputting a protection gas to the arc discharge reaction chamber 410 via an inlet pipe 418 thereof; and (h) switching on the electrical source and producing an arc discharge between the carbon rod 409 and the pure carbon rod 408, such that the carbon isotope segments 402, 403 and 404 are consumed in sequence to form the isotope-doped carbon nanotubes 30.

In step (e), the carbon rod 409 can be manufactured by a powder delamination pressing method, which includes the following steps:

(e1) mixing a catalyst powder with a carbon-12 powder, a carbon-13 powder and a carbon-14 powder respectively to form three kinds of powder mixtures;

(e2) pressing the first powder mixture including carbon-12 isotopes under 3500 pascals to form one first carbon isotope segment 402;

(e3) pressing the second powder mixture including carbon-13 isotopes under 3500 pascals on the first carbon isotope segment 402 to form one second carbon isotope segment 403;

(e4) pressing the third powder mixture including carbon-14 isotopes under 3500 pascals on the second carbon isotope segment 403 to form one third carbon isotope segment 404; and (e5) repeating steps (e2), (e3) and (e4) appropriately to form the carbon rod 409.

In step (e1), the catalyst powder can be a nickel powder, a yttrium oxide powder, or a mixture thereof. In the second preferred embodiment, a diameter of the carbon rod 409 is about 10 millimeters.

Alternatively, the carbon rod 409 can be manufactured by a paste delamination sintering method, which includes the following steps:

(e1') mixing a catalyst powder, a solvent with a carbon-12 powder, a carbon-13 powder and a carbon-14 powder respectively to form three kinds of paste mixtures;

(e2') coating/printing and drying a layer of the first paste mixture including carbon-12 isotopes to form one first carbon isotope segment 402;

(e3') coating/printing and drying a layer of the second paste mixture including carbon-13 isotopes on the first carbon isotope segment 402 to form one second carbon isotope segment 403;

(e4') coating/printing and drying a layer of the third paste mixture including carbon-14 isotopes on the second carbon isotope segment 403 to form one third carbon isotope segment 404; and (e5') repeating steps (e2'), (e3') and (e4') appropriately to form the carbon rod 409.

In step (e1'), the catalyst powder can be a nickel powder, a yttrium oxide powder, or a mixture thereof. In the second preferred embodiment, a diameter of the carbon rod 409 is about 10 millimeters.

In step (g), a distance between the carbon rod 409 and the pure carbon rod 408 is in the range from 1.5 to 2 millimeters. The protection gas can be helium gas, argon gas, nitrogen gas, or hydrogen gas. In the second preferred embodiment, the protection gas is helium gas, and a pressure of the helium gas is in the range from 100 to 500 torr.

In step (h), the discharge current is about 100 amperes, and the discharge voltage is in the range from 20 to 40 volts. During the growth process of the carbon nanotubes 30, the first carbon isotope segment 402 is firstly consumed to form the first carbon nanotube isotope segments 302 on the pure carbon rod 408. Then, the second carbon isotope segment 403 is consumed to form the second carbon nanotube isotope segments 303 on the first carbon nanotube isotope segments 302. After that, the third carbon isotope segment 404 is consumed to form the third carbon nanotube isotope segments 304 on the second carbon nanotube isotope segments 303.

Compared with conventional carbon nanotube manufacturing methods, the preferred method of the present invention can manufacturre the isotope-doped carbon nanotubes each including at least two kinds of carbon nanotube isotope segments. Therefore, growth patterns of the carbon isotopes can be recorded respectively by means of Raman Spectrum or by means of Secondary Ion Mass Spectroscopy. Thus, growth mechanisms of the carbon nanotubes can be readily studied corresponding to the growth patterns of the carbon isotopes.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A method for manufacturing isotope doped carbon nanotubes, comprising the steps of:
   (a) providing a carbon rod connected with an anode of an electrical source, the carbon rod comprising at least two kinds of carbon isotope segments arranged alternately along a longitudinal direction of the carbon rod;
   (b) providing a pure carbon rod connected with a cathode of the electrical source, the pure carbon rod positioned corresponding to the carbon rod; and
   (c) producing an arc discharge between the carbon rod and the pure carbon rod, the carbon isotope segments of the carbon rod being consumed in sequence to form the isotope doped carbon nanotubes.

2. The method as claimed in claim 1, wherein the carbon isotope segments are selected from the group consisting of a carbon-12 isotope segment, a carbon-13 isotope segment, and a carbon-14 isotope segment.

3. The method as claimed in claim 2, wherein the carbon isotope segments further comprise one or more catalyst powders.

4. The method as claimed in claim 3, wherein the catalyst powders are selected from the group consisting of a nickel powder, a yttrium oxide powder, and any mixture thereof.

5. The method as claimed in claim 4, wherein the carbon rod is manufactured by a powder delamination pressing method or a paste delamination sintering method.

6. The method as claimed in claim 5, wherein the powder delamination pressing method comprises the steps of;
   (a1) mixing one or more catalyst powders with the carbon isotopes to form at least two kinds of powder mixtures;
   (a2) pressing a first powder mixture comprising a first carbon isotope to form a first carbon isotope segment;
   (a3) pressing a second powder mixture comprising a second carbon isotope to form a second carbon isotope segment on the first carbon isotope segment; and
   (a4) repeating steps (a2) and (a3) appropriately in turn to form the carbon rod.

7. The method as claimed in claim 5, wherein the paste delamination sintering method comprises the steps of:
   (a1') mixing one or more catalyst powders, a solvent with the carbon isotopes to form at least two kinds of paste mixtures;
   (a2') coating/printing and drying a layer of a first paste mixture comprising a first carbon isotope to form a first carbon isotope segment;
   (a3') coating/printing and drying a layer of a second paste mixture comprising a second carbon isotope to form a second carbon isotope segment on the first carbon isotope segment; and
   (a4') repeating steps (a2') and (a3') appropriately in turn to form the carbon rod.

8. The method as claimed in claim 1, wherein the pure carbon rod comprises carbon-12 isotopes.

9. The method as claimed in claim 1, wherein a discharge current of the arc discharge in step (c) is about 100 amperes.

10. The method as claimed in claim 1, wherein a protection gas is provided in step (c).

11. The method as claimed in claim 10, wherein the protection gas is helium gas, argon gas, nitrogen gas, or hydrogen gas.

12. The method as claimed in claim 1, wherein a diameter of the carbon rod is about 10 millimeters.

13. A method for manufacturing isotope doped carbon nanotubes, comprising the steps of:
   preparing a carbon rod comprising at least two kinds of carbon isotope segments arranged alternately along a longitudinal direction of the carbon rod;
   placing said rod in a reaction chamber facing an electrifiable anode therein; and
   electrifying said rod and said anode so as to generate an arc discharge between said rod and said anode for forming said isotope doped carbon nanotubes.

14. An apparatus for manufacturing isotope doped carbon nanotubes of an element, comprising:
   a reaction chamber;

a carbon rod placed in said reaction chamber and having at least two kinds of carbon isotope segments of said element arranged alternately along a longitudinal direction of the carbon rod; and a power source electrically and electrically connected to said carbon rod so as to generate an arc discharge thereon for forming said isotope doped carbon nanotubes of said element.

15. The apparatus as claimed in claim 14, wherein the carbon isotope segments are selected from the group consisting of a carbon-12 isotope segment, a carbon-13 isotope segment, and a carbon-14 isotope segment.

16. The apparatus as claimed in claim 14, wherein the carbon isotope segments further comprise one or more catalyst powders.

17. The apparatus as claimed in claim 16, wherein the catalyst powders are selected from the group consisting of a nickel powder, a yttrium oxide powder, and any mixture thereof.

18. The apparatus as claimed in claim 14, wherein a discharge current of the arc discharge is about 100 amperes.

* * * * *

UNITED STATES PATENT AND TRADEMARK OFFICE
CERTIFICATE OF CORRECTION

PATENT NO.       : 7,625,530 B2                                    Page 1 of 1
APPLICATION NO.  : 11/141575
DATED            : December 1, 2009
INVENTOR(S)      : Fan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Second Day of November, 2010

David J. Kappos
*Director of the United States Patent and Trademark Office*